United States Patent
Hur et al.

(10) Patent No.: US 11,942,632 B2
(45) Date of Patent: Mar. 26, 2024

(54) POSITIVE ELECTRODE ACTIVE MATERIAL PARTICLE INCLUDING CORE CONTAINING LITHIUM COBALT OXIDE AND SHELL CONTAINING COMPOSITE METAL OXIDE AND PREPARATION METHOD THEREOF

(71) Applicant: LG Chem, Ltd., Seoul (KR)

(72) Inventors: Hyuck Hur, Daejeon (KR); Chi Ho Jo, Daejeon (KR); Bo Ram Lee, Daejeon (KR); Sung bin Park, Daejeon (KR); Young uk Park, Daejeon (KR); Wang Mo Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 722 days.

(21) Appl. No.: 15/724,773

(22) Filed: Oct. 4, 2017

(65) Prior Publication Data

US 2018/0102539 A1    Apr. 12, 2018

(30) Foreign Application Priority Data

Oct. 6, 2016 (KR) .................. 10-2016-0129305
Jul. 31, 2017 (KR) .................. 10-2017-0097283

(51) Int. Cl.
  *H01M 4/525* (2010.01)
  *H01M 4/02* (2006.01)
  (Continued)

(52) U.S. Cl.
  CPC ......... *H01M 4/525* (2013.01); *H01M 4/0471* (2013.01); *H01M 4/0478* (2013.01); *H01M 4/131* (2013.01); *H01M 4/1391* (2013.01); *H01M 4/366* (2013.01); *H01M 10/052* (2013.01); *H01M 2004/028* (2013.01); *H01M 10/0567* (2013.01); *Y02E 60/10* (2013.01)

(58) Field of Classification Search
  None
  See application file for complete search history.

(56) References Cited

U.S. PATENT DOCUMENTS

| 8,920,973 B2 | 12/2014 | Takei | |
| 2002/0071990 A1* | 6/2002 | Kweon | ................ C01G 51/50 |
| | | | 429/231.1 |

(Continued)

FOREIGN PATENT DOCUMENTS

| DE | 19922522 A1 * | 11/2000 | ............ H01M 4/366 |
| JP | 2015-015169 A | 1/2015 | |

(Continued)

OTHER PUBLICATIONS

Machine translation of DE 19922522 A1 (Oesten) (Year: 2000).*

*Primary Examiner* — Barbara L Gilliam
*Assistant Examiner* — Helen M McDermott
(74) *Attorney, Agent, or Firm* — Lerner David LLP

(57) ABSTRACT

A positive electrode active material particle includes a core that contains lithium cobalt oxide represented by the following Chemical Formula $Li_aCo_{(1-x)}M_xO_{2-y}A_y$, and a shell that is coated on the surface of the core and contains composite metal oxide of a metal with an oxidation number of +2 and a metal with an oxidation number of +3. In particular, M is at least one selected from the group consisting of Ti, Mg, Zn, Si, Al, Zr, V, Mn, Nb and Ni. A is oxygen-substitutional halogen and $1.00 \leq a \leq 1.05$, $0 \leq x \leq 0.05$, and $0 \leq y \leq 0.001$.

8 Claims, 4 Drawing Sheets

(51) Int. Cl.
*H01M 4/04* (2006.01)
*H01M 4/131* (2010.01)
*H01M 4/1391* (2010.01)
*H01M 4/36* (2006.01)
*H01M 10/052* (2010.01)
*H01M 10/0567* (2010.01)

(56) References Cited

U.S. PATENT DOCUMENTS

| | | | |
|---|---|---|---|
| 2003/0087155 A1* | 5/2003 | Cho | H01M 4/505 429/231.95 |
| 2009/0309063 A1 | 12/2009 | Paulsen et al. | |
| 2011/0059356 A1* | 3/2011 | Ogasawara | H01M 4/366 429/188 |
| 2013/0101893 A1 | 4/2013 | Dai et al. | |
| 2013/0115513 A1* | 5/2013 | Choi | H01M 4/525 429/213 |
| 2016/0276664 A1* | 9/2016 | Gunji | H01M 50/411 |
| 2017/0324093 A1* | 11/2017 | Tamai | H01M 4/525 |

FOREIGN PATENT DOCUMENTS

| | | |
|---|---|---|
| KR | 10-2002-0024520 A | 3/2002 |
| KR | 10-2003-0033912 A | 5/2003 |
| KR | 10-2009-0115140 A | 11/2009 |
| KR | 10-2014-0072119 A | 6/2014 |
| KR | 10-1607916 B1 | 3/2016 |
| KR | 10-2016-0039983 A | 4/2016 |

\* cited by examiner

POSITIVE ELECTRODE ACTIVE MATERIAL PARTICLE INCLUDING CORE CONTAINING LITHIUM COBALT OXIDE AND SHELL CONTAINING COMPOSITE METAL OXIDE AND PREPARATION METHOD THEREOF

CROSS REFERENCE TO RELATED APPLICATIONS

This application claims the benefit of Korean Patent Application No. 10-2016-0129305 on Oct. 6, 2016 and Korean Patent Application No. 10-2017-0097283 on Jul. 31, 2017, the disclosures of which are herein incorporated by reference in their entirety.

TECHNICAL FIELD

The present disclosure relates to a positive electrode active material particle and more particularly, to a positive electrode active material particle including a core that contains lithium cobalt oxide and a shell that includes composite metal oxide and a method of preparing the same.

RELATED ART

Recently, increasing technology developments and demands for mobile devices, having secondary batteries as an energy source have rapidly increased. For example, secondary batteries including lithium secondary batteries having high energy density and working potential, a long lifespan, and a low self-discharge rate have been commercialized and widely used. Further, studies have been conducted on electric vehicles and hybrid electric vehicles which may be employed in place of vehicles using fossil fuels, (e.g., gasoline vehicles, diesel vehicles, etc.) which contribute to air pollution. Although nickel hydrogen metal secondary batteries have been mainly used as a power source of the electric vehicles and hybrid electric vehicles, use of lithium secondary batteries having high energy density and discharge voltage has been actively studied, and are now commercially available.

Typically, a positive electrode material for the lithium secondary battery, $LiCoO_2$, ternary materials (NMC/NCA), $LiMnO_4$, $LiFePO_4$, etc. are used. However, $LiCoO_2$ includes cobalt is expensive and has reduced capacity at the same voltage, when compared to ternary materials. Therefore, the use of ternary materials is gradually increasing in order to increase the capacity of secondary batteries. However, $LiCoO_2$ has been widely used due to high rolling density advantages. In order to develop high-capacity secondary batteries, research has been conducted to increase an operating voltage. However, when a high voltage is applied to lithium cobalt oxide, more particularly, a high voltage of to 4.5 V or greater is applied thereto in order to achieve high capacity, and the Li usage of $LiCoO_2$ increases which creates an unstable surface. Accordingly, side reactions with an electrolyte occur to generate gas, resulting in a reduction of safety (e.g., a swelling phenomenon, etc.), an increase of possibility of structural instability, and a rapid reduction of lifespan property.

Instead, to remedy the known problems, a method of doping or coating the surface of $LiCoO_2$ with a metal such as Al, Ti, Mg, or Zr is used. However, a coating layer composed of the metal interrupts movement of Li ions during charge/discharge cycling and, the performances of the secondary batteries deteriorates. Accordingly, a lithium cobalt oxide-based positive electrode active material which may be stably used without deterioration of performances at high voltages is desired.

The above information disclosed in this section is merely for enhancement of understanding of the background of the disclosure and therefore it may contain information that does not form the prior art that is already known in this country to a person of ordinary skill in the art.

SUMMARY

An aspect of the present disclosure provides, a positive electrode active material particle that may include a core that contains lithium cobalt oxide represented by the Chemical Formula $Li_aCo_{(1-x)}M_xO_{2-y}A_y$, and a shell that is coated on the surface of the core and contains a composite metal oxide of a metal with an oxidation number of +2 and a metal with an oxidation number of +3 For example, M may be at least one selected from the group consisting of Ti, Mg, Zn, Si, Al, Zr, V, Mn, Nb and Ni. A may be an oxygen-substitutional halogen. The a, x, and y satisfy the conditions of $1.00 \leq a \leq 1.05$, $0 \leq x \leq 0.05$, and $0 \leq y \leq 0.001$.

In some exemplary embodiments, the positive electrode active material particle of may include a thickness of the shell that is about 5 nanometer to about 100 nanometer. In some exemplary embodiments, the positive electrode active material particle may include the shell formed on the area of about 50% to about 100% of the surface area of the core. The positive electrode active material may include the composite metal oxide of the shell that has a layered structure.

In other exemplary embodiments, the positive electrode active material particle of may include the composite metal oxide represented by the following Chemical Formula $M'_tM''_wO_u$. For example M' may be a metal with an oxidation number of +2, one or greater selected from the group consisting of Co, Zn, Mg, Fe, Cu and Ni. In addition, M" may be a metal with an oxidation number of +3, one or more selected from the group consisting of Al, Co, Ni and Fe. The t, w, and u satisfy the conditions of $0.125 \leq t/w \leq 1$ and $0.6 \leq (t+w)/u \leq 0.8$. Further, u may be determined according to values of t and w. In some exemplary embodiments, the positive electrode active material particle may include M' being Co, Zn, Ni or Mg, and M" may be Al.

In other exemplary embodiments, the positive electrode active material particle may include an outermost surface layer that is coated on the shell and may include a composite metal oxide of a metal with an oxidation number of +2 and a metal with an oxidation number of +3. The positive electrode active material may include the outermost surface layer having at least one of metal that is a metal not included in the shell.

In some exemplary embodiments, a method of preparing the positive electrode active material particle may include preparing a solution for preparing the shell including a M'-containing metal salt and a M"-containing metal salt, dispersing lithium cobalt oxide of a particle state in a solvent, adding the solution for preparing the shell thereto, and mixing the lithium cobalt oxide and the solution for preparing the shell with each other; and filtering, drying, and heat-treating the mixed solution of the lithium cobalt oxide and the solution for preparing the shell. The M' may be a metal with an oxidation number of +2, one or more selected from the group consisting of Co, Zn, Mg, Fe, Cu and Ni. Additionally, M" may be a metal with an oxidation number of +3, one or more selected from the group consisting of Al, Co, Ni and Fe;

In other exemplary embodiments, the method of preparing the positive electrode active material particle may include the solvent that the lithium cobalt oxide of a particle state is dispersed in being water. The method of preparing the positive electrode active material particle may include a particle size (D50) of the lithium cobalt oxide of a particle state in the range of about 5 micrometer to about 25 micrometer.

In another exemplary embodiment, the method of preparing the positive electrode active material particle may include preparing a solution for preparing an outermost surface layer including a M'-containing metal salt and a M"-containing metal salt, dispersing shell-formed lithium cobalt oxide of a particle state in a solvent, adding the solution for preparing the outermost surface layer thereto, mixing the shell-formed lithium cobalt oxide of a particle state with the solution for preparing the outermost surface layer, and filtering, drying, and heat-treating the mixed solution of the shell-formed lithium cobalt oxide of a particle state and the outermost surface layer. For example, M' may be a metal with an oxidation number of +2, and may be one or more selected from the group consisting of Co, Zn, Mg, Fe, Cu and Ni. Additionally, M" may be a metal with an oxidation number of +3, and one or more selected from the group consisting of Al, Co, Ni and Fe. In some exemplary embodiments, the method of preparing the positive electrode active material particle may include at least one of the M'-containing metal salt and the M"-containing metal salt included in the solution for preparing the outermost surface layer having a metal different from the metals of the metal salts included in the solution for preparing the shell.

In another exemplary embodiment, a method of preparing the positive electrode active material particle may include preparing M'-M" composite hydroxide from a solution that includes a M'-containing metal salt and a M"-containing metal salt, mixing the M'-M" composite hydroxide of a particle state with lithium cobalt oxide of a particle state; and heat-treating the mixture of the M'-M" composite hydroxide of a particle state and the lithium cobalt oxide of a particle state. For example, M' may include a metal with an oxidation number of +2 and one or more selected from the group consisting of Co, Zn, Mg, Fe, Cu and Ni. Additionally, M" may be a metal with an oxidation number of +3 and one or more selected from the group consisting of Al, Co, Ni and Fe) by co-precipitation reaction;

In some exemplary embodiments, the method of preparing the positive electrode active material particle may include the M'-M" composite hydroxide being $[M'_tM''_w(OH)_2]^{q+}(X^{n-})_{q/n} \cdot zH_2O$. X may be an anion and includes $Cl^-$, $CO_3^{2-}$, $OH^-$, $NO^{3-}$, $SO_4^{2-}$, $PO_4^{3-}$, $0.125 \le t/w \le 1$, and q may be determined according to values of t and w. In other exemplary embodiments, the method of preparing the positive electrode active material particle may include preparing a second M'-M" composite hydroxide from a solution including a M'-containing metal salt and a M"-containing metal salt, mixing the second M'-M" composite hydroxide of a particle state with the shell-formed lithium cobalt oxide of a particle state; and heat-treating the mixture of the composite hydroxide of a particle state and the shell-formed lithium cobalt oxide of a particle state. In particular, M' may be a metal with an oxidation number of +2 and may be one or more selected from the group consisting of Co, Zn, Mg, Fe, Cu and Ni. Further, M" may be a metal with an oxidation number of +3 and may be one or more selected from the group consisting of Al, Co, Ni and Fe by co-precipitation reaction.

In some exemplary embodiments, method of preparing the positive electrode active material particle may include at least one of the M'-containing metal salt and the M"-containing metal salt in the solution for preparing the second M'-M" composite hydroxide includes a metal different from the metals of the metal salts included in the solution of the M'-M" composite hydroxide formed from a solution including the M'-containing metal salt and the M"-containing metal salt.

In other exemplary embodiments, the method of preparing the positive electrode active material particle may include the M'-containing metal salt and the M"-containing metal salt mixed in the range where a molar ratio of M' and M" satisfies the condition of M'/M"=0.125~1. The method of preparing the positive electrode active material particle may include the metal salt being one or more selected from chloride, sulfate, carbonate, and nitrate. The method of preparing the positive electrode active material particle may include the heat treatment of the process heat-treating the mixture of the M'-M" composite hydroxide of a particle state and the lithium cobalt oxide of a particle state performed at about 600° C. to about 1100° C. for about 1 hour to about 10 hours.

In another exemplary embodiment, the method of preparing the positive electrode active material may include the heat treatment of the process heat-treating the mixture of the composite hydroxide of a particle state and the shell-formed lithium cobalt oxide of a particle state performed at about 600° C. to about 1100° C. for about 1 hour to about 10 hours.

In another aspect, a secondary battery may include a positive electrode including the positive electrode active material particle, a negative electrode, and an electrolyte. The secondary battery may include an electrolyte having electrolyte additives and dinitrile additives. The electrolyte additives may include at least one of ethylene carbonate, vinyl acetate, vinyl ethylene carbonate, thiophene, 1,3-propane sultone, succinic anhydride. The dinitrile additive may include at least one of malononitrile, succinonitrile, glutaronitrile, adiponitrile, and phthalonitrile. A battery pack may include the secondary battery A device may additionally include the battery pack.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
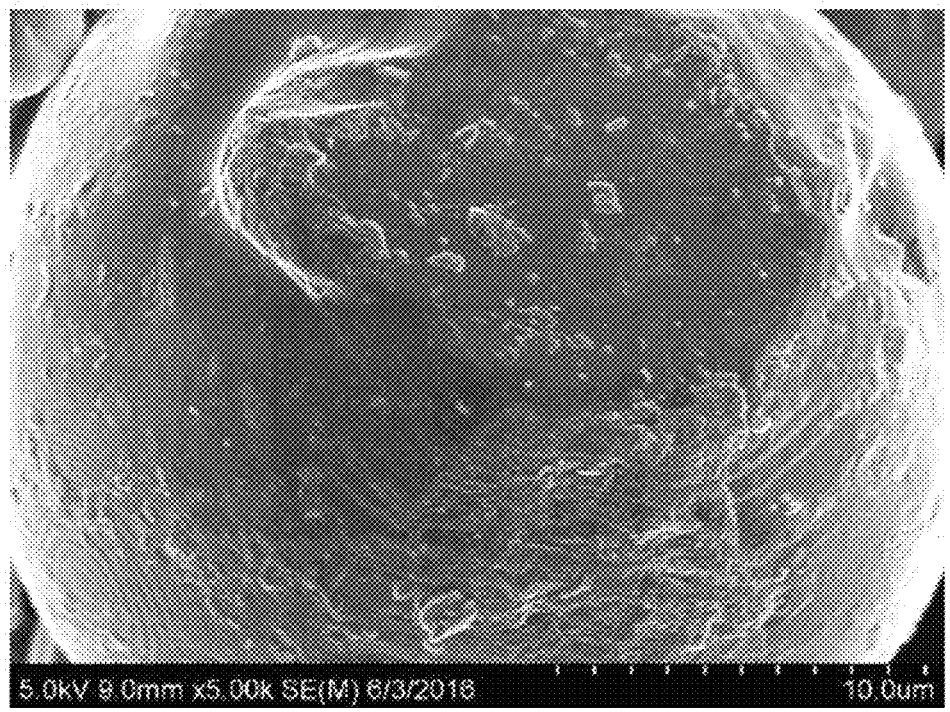
FIG. 1 is an exemplary SEM image of a positive electrode active material particle according to an exemplary embodiment of the present disclosure.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In particular, a positive electrode active material particle according to the present disclosure may include a core that contains lithium cobalt oxide represented by the following Chemical Formula $LiaCo(1-x)MxO2-yAy$; and a shell that is coated on the surface of the core and contains a composite metal oxide of a metal with an oxidation number of +2 and a metal with an oxidation number of +3. In addition, M may be at least one selected from the group consisting of Ti, Mg, Zn, Si, Al, Zr, V, Mn, Nb and Ni. A may be oxygen-substitutional halogen. The a, x, and y satisfy the conditions of $1.00 \leq a \leq 1.05$, $0 \leq x \leq 0.05$, and $0 \leq y \leq 0.001$.

Generally, when lithium cobalt oxide as a positive electrode active material is used at a high voltage, a large quantity of lithium ions are released from lithium cobalt oxide particles to destroy a crystal structure. The resulting unstable crystal structure is broken down and eventually, the reversibility of the structure is reduced. In addition, when $Co^{3+}$ or $Co^{4+}$ ions present on the surface of lithium cobalt oxide particles are reduced by an electrolyte when lithium ions are released, oxygen is removed from the crystal structure, and the structure breakdown is exacerbated. Therefore, in order to stably utilize lithium cobalt oxide at a high voltage, side reactions between the cobalt ions and the electrolyte may be suppressed to stably maintain the crystal structure even though a large amount of lithium ions are released.

Accordingly, in the present disclosure, a shell containing a composite metal oxide of a metal with an oxidation number of +2 and a metal with an oxidation number of +3 may be formed on the surface of lithium cobalt oxide to reduce reactivity with an electrolyte, compared to known positive electrode active material particles containing the lithium cobalt oxide. Accordingly, dissolution of Co may be avoided, a safety problem (e.g., a swelling phenomenon caused by gas generation) may be prevented, and surface structural changes may be suppressed even at high voltages to improve structural stability of the positive electrode active material particle and lifespan property of the secondary battery. Additionally, the shell may include a layered structure to allow movement of lithium ions in the shell, thereby effectively preventing deterioration of a rate property of the secondary battery.

In a an exemplary embodiment, a thickness of the shell formed on the surface of the core may be about 5 nm to about 100 nm, and particularly, about 10 nm to about 30 nm. When the thickness of the shell is less than 5 nm out of the above range, a proportion of the shell in the positive electrode active material particle is too low, and thus the desired effects may not be sufficiently achieved. On the contrary, when the thickness of the shell is greater than 100 nm, a proportion of the shell in the positive electrode active material particle is too high, and the entire capacity of the positive electrode active material may be relatively reduced, and rolling density may be reduced and energy density per volume in the cell may be reduced and the output characteristic may be reduced.

Further, in an exemplary embodiment, the shell may be coated on the area of 50% to 100% with respect to the surface area of the core. When the shell is coated on the area of less than 50%, out of the above range, with respect to the surface area of the core, the coating area of the shell is too small, and the desired effects is not sufficiently achieved.

The composite metal oxide of the shell thus formed, particularly, composite oxide of a metal of +2 and a metal of +3 may have a layered structure like the lithium cobalt oxide of the core. Therefore, since the shell including the composite metal oxide suppresses a reaction with an electrolyte on the surface of lithium cobalt oxide dissolution of Co may be prevented and the structural stability of the surface may be secured. Simultaneously, since the shell is coated as the layered structure to serve as a transmitter of Li ions, movement of Li ions from the lithium cobalt oxide may be further facilitated to prevent deterioration of output characteristic.

In an exemplary embodiment, the composite metal oxide may be represented by the following Chemical Formula 2: $M'_tM''_wO_u$. For example, M' may be a metal with an oxidation number of +2 and may be one or more selected from the group consisting of Co, Zn, Mg, Fe, Cu and Ni. Additionally, M'' may be a metal with an oxidation number of +3 and may be one or more selected from the group consisting of Al, Co, Ni and Fe. The t, w, and u satisfy the conditions of $0.125 \leq t/w \leq 1$ and $0.6 \leq (t+w)/u \leq 0.8$. Further, u may be determined according to the values of t and w. More particularly, M' may be Co, Zn, Ni, or Mg, and M" may be Al.

The oxide represented by Chemical Formula 2 may form $[M'_tM''_w(OH)_2]^{q+}(X^{n-})_{q/n} \cdot zH_2O$ having a layered structure during adsorption of the metal elements of the composite metal oxide onto the surface of the lithium cobalt oxide particle and the anions such as X exist in the layered structure for charge valence and when sintered, all or part thereof may be removed to form the composite metal oxide having the layered structure. In particular, X may be an anion and may include $Cl^-$, $CO_3^{2-}$, $OH^-$, $NO^{3-}$, $SO_4^{2-}$, $PO_4^{3-}$)

Furthermore, the positive electrode active material particle may further include an outermost surface layer that is coated on the shell and may include a composite metal oxide of a metal with an oxidation number of +2 and a metal with an oxidation number of +3. In other words, the composite metal oxide included in the outermost surface layer may have the same composition as the composite metal oxide included in the shell. In particular, at least one of the metals constituting the outermost surface layer may be a metal which is not included in the shell and therefore, the shell and the outermost surface layer may have different compositions from each other. For example, the positive electrode active material particle of the present disclosure may include a multilayered structure in which one or more composite metal oxide layers of the layered structure are laminated on the core of lithium cobalt oxide.

Additionally, the present disclosure provides a method of preparing the positive electrode active material particle. The method may include preparing a solution for preparing the shell including a M'-containing metal salt and a M"-containing metal salt (e.g., process a), dispersing lithium cobalt oxide of a particle state in a solvent, adding the solution for preparing the shell thereto (e.g., process b), and mixing them with each other and filtering, drying, and heat-treating the mixed solution (e.g, process c). For example, M' may be a metal with an oxidation number of +2 and one or more selected from the group consisting of Co, Zn, Mg, Fe, Cu and Ni. Additionally, M" may be a metal with an oxidation number of +3 and one or more selected from the group consisting of Al, Co, Ni and Fe.

According to an exemplary embodiment of the preparation method, the positive electrode active material particle of the present disclosure may be prepared by primarily coating the lithium cobalt oxide particles with the solution for preparing the shell under drying, and then forming the composite metal oxide by heat-treatment of the mixed solution. Specifically, in the process (b), during adsorption of the metal ions of $M'^{2+}$ and $M''^{3+}$ onto the surface of the lithium cobalt oxide particles, $[M'_tM''_w(OH)_2]^{q+}(X^{n-})_{q/n} \cdot zH_2O$ (e.g., X is an anion and includes $Cl^-$, $CO_3^{2-}$, $OH^-$, $NO^{3-}$, $SO_4^{2-}$, $PO_4^{3-}$) having a layered structure is formed and coated in such a way that the anions such as X exist between the layered structures for charge valence, and all or part thereof is removed during the heat treatment of the process (c).

Therefore, the composite metal oxide forming the shell may be coated as the layered structure on the surface of the core by coating the surface of the lithium cobalt oxide particles forming the core with the composite metal oxide forming the shell at a precursor stage. Accordingly, since the shell may form a continuous structure with respect to the core, a structurally stable shell may be formed. When the structure is a structure in which $M'^{2+}$ and $M''^{3+}$ metals are uniformly mixed, a chemically more stable shell layer may be formed. In this regard, the solvent of the dispersion process (process (b)) is not limited, and particularly, the solvent may be water. A solvent used in the preparation of the solution for preparing the shell may be the same as or different from the solvent of the dispersion process (process (b)), and they are more preferably the same as each other.

In an exemplary embodiment, a particle size (D50) of the lithium cobalt oxide in a particle state may be 5 micrometer or 25 micrometer. When the particle size is less than 5 micrometer out of the above range, it is difficult to control the lithium cobalt oxide particles, and thus there is a difficulty in the process. When the particle size is greater than 25 micrometer, there is a loss in terms of rolling density, capacity, etc.

Furthermore, a method of preparing the positive electrode active material particle further including the outermost surface layer may further include a process of preparing a solution for preparing the outermost surface layer including a M'-containing metal salt (e.g., M' is, a metal with an oxidation number of +2, one or more selected from the group consisting of Co, Zn, Mg, Fe, Cu and Ni) and a M"-containing metal salt (e.g., M" is, a metal with an oxidation number of +3, one or more selected from the group consisting of Al, Co, Ni and Fe) (process d), a process of dispersing shell-formed lithium cobalt oxide of a particle state in a solvent, adding the solution for preparing the outermost surface layer thereto, and mixing them with each other (process e) and a process of filtering, drying, and heat-treating the mixed solution (process f).

In particular, a kind of the metal of the metal salt included in the solution for preparing the outermost surface layer may differ depending on whether the composition of the composite metal oxide included in the outermost surface layer is the same as or different from the composition of the shell. Specifically, when the compositions are the same as each other, a solution which is the same as the solution for preparing the shell may be used. When the compositions are different from each other, at least one of the M'-containing metal salt and the M"-containing metal salt included in the solution for preparing the outermost surface layer of the process (process d) may include a metal different from the metals of the metal salts included in the solution for preparing the shell.

In the preparation method, the mixed solution of the solution where the lithium cobalt oxide is dispersed in the solvent and the solution for preparing the shell or the outermost coating layer may be maintained at about a pH of 7 to about pH 12, particularly, at pH of 8 to pH 11. When pH of the solution is less than 7 out of the above range, adsorption of the metal ions in the preparation solution may not occur uniformly, and the adsorbed metal ions may be dissolved into the solution again to fail to form the coating layer, and thus the layered structure desired in the present disclosure may not be formed. When pH of the solution is greater than 12, the metal ions are precipitated in the form of hydroxide, and they are not coated on the surface of lithium cobalt oxide, which is not preferable.

Furthermore, the present disclosure provides another exemplary method of preparing the positive electrode active material particle. The method may include a process of preparing M'-M" composite hydroxide from a solution including a M'-containing metal salt (e.g., M' is, a metal with an oxidation number of +2, one or more selected from the group consisting of Co, Zn, Mg, Fe, Cu and Ni) and a M"-containing metal salt (e.g., M" is, a metal with an oxidation number of +3, one or more selected from the group consisting of Al, Co, Ni and Fe) by co-precipitation reaction (process a), a process of mixing the M'-M" composite hydroxide of a particle state with lithium cobalt oxide of a particle state (process b) and a process of heat-treating the mixture (process c).

According to an exemplary embodiment, the preparation method of the positive electrode active material particle may be prepared by preparing composite metal hydroxide as a precursor of composite metal oxide forming the shell by co-precipitation reaction, mixing the composite metal hydroxide with the lithium cobalt oxide particle, and heat-treating the mixture to form the composite metal oxide on the lithium cobalt oxide particle core. Therefore, the composite metal oxide forming the shell may be adsorbed in the form of hydroxide onto the surface of the lithium cobalt oxide particle forming the core, and then may be changed into oxide by heat treatment such that it may be coated as a layered structure on the surface of the core.

The above method may more easily control the composition and structure of the composite oxide layer which protects the surface and to form the composite oxide having a uniform layered structure on the surface of the core to reduce the sensitivity to pH. Compared to a method of using an aqueous solution, the method of the exemplary embodiment discussed about has an advantage of providing a more uniform composition of the shell layer. In this regard, the M'-M" composite hydroxide prepared in the process (a) may be $[M'_tM''_w(OH)_2]^{q+}(X^{n-})_{q/n} \cdot zH_2O$ (e.g., X is an anion and includes $Cl^-$, $CO_3^{2-}$, $OH^-$, $NO_3^-$, $SO_4^{2-}$, $PO_4^{3-}$, $0.125 \leq t/w \leq 1$, and q is determined according to the values of t and w). The shell-forming precursor in the form of hydroxide may be transformed into the oxide form to be more strongly adsorbed onto the surface of the lithium cobalt oxide particle.

Furthermore, in an exemplary embodiment, a method of preparing the positive electrode active material particle further including an outermost surface layer may include a process of preparing a second M'-M" composite hydroxide from a solution including a M'-containing metal salt (e.g., M' is, a metal with an oxidation number of +2, one or more selected from the group consisting of Co, Zn, Mg, Fe, Cu and Ni) and a M"-containing metal salt (e.g., M" is, a metal with an oxidation number of +3, one or more selected from the group consisting of Al, Co, Ni and Fe) by co-precipitation reaction (process d), a process of mixing the second M'-M" composite hydroxide of a particle state with the shell-formed lithium cobalt oxide of a particle state (process e) and a process of heat-treating the mixture (process f).

In other words, a kind of the metals of the metal salts included in the solution of the process (d) for preparing the second M'-M" composite hydroxide may differ based on whether the composition of the composite metal oxide included in the outermost surface layer is the same as or different from the composition of the shell. Specifically, when the compositions are the same as each other, a solution which is the same as the solution for preparing the shell-forming hydroxide may be used. When the compositions are different from each other, at least one of the M'-containing metal salt and the M"-containing metal salt in the solution of the process (d) for preparing the second M'-M" composite hydroxide may include a metal different from the metals of the metal salts included in the solution of the process (a). For example, a mixing ratio of the composite metal hydroxide formed by co-precipitation may be properly determined according to a coating thickness.

Further, in order to prepare the positive electrode active material particle according to an exemplary embodiment of the present disclosure in each preparation method, the M'-containing metal salt and the M"-containing metal salt may be used to form the shell or the outermost surface layer, as described above. In the above solutions, the M'-containing metal salt and the M"-containing metal salt may be mixed in the range where a molar ratio of M' and M" satisfies the condition of M'/M"=0.125~1. When the M'/M" ratio is less than 0.125 or greater than 1 out of the above range, the layered structure is not formed, and the M'-containing metal salt or the M"-containing metal salt is formed, and therefore, the shell may not be formed, which is not preferable. In an exemplary embodiment, the kind of the metal salt is not limited, but the metal salt may be particularly one or more selected from chloride, sulfate, carbonate, and nitrate.

Further, in each preparation process, the drying of the process (c) may be particularly performed at 30° C. to 130° C. for 1 hour to 24 hours, and heat treatment of the process (c) or (f) may be performed in the range of 600° C. to 1100° C., particularly, in the range of 700° C. to 1000° C. for 1 hour to 10 hours. When the drying of the process (c) is performed at an excessively low temperature or for a too short of a time duration out of the above range, drying may not be sufficient. On the contrary, when the drying is performed at an excessively high temperature or for a too long of a time duration, a reaction which may cause a structural change may occur, which is not preferable.

Further, when the heat treatment of the process (c) and the process (f) is performed at an excessively low temperature or for a too short of a time duration out of the above range, the core-shell structure of the positive electrode active material particle may not be stably formed. On the contrary, when the heat treatment is performed at an excessively high temperature or for a too long of a time, duration physical or chemical properties of lithium cobalt oxide and composite metal oxide constituting the positive electrode active material particle may be changed to which cause performance deterioration.

Further, an exemplary embodiment of the present disclosure provides a secondary battery that may include a positive electrode having the positive electrode active material particles, a negative electrode, and an electrolyte. The kind of the secondary battery is not particularly limited, but specific example thereof may include lithium secondary batteries having advantages of high energy density, discharge voltage, output stability, etc., such as a lithium ion battery, a lithium ion polymer battery, etc. Generally, the lithium secondary battery consists of a positive electrode, a negative electrode, a separator, and a non-aqueous electrolyte containing lithium salts. For example, the positive electrode may be fabricated by applying a mixture of the positive electrode active material, a conductive material, and a binder onto a positive electrode collector, and a filler may be further added to the mixture.

The conductive material may be added in an amount of about 1 wt % to 30 wt % based on the total weight of the mixture including the positive electrode active material. The conductive material is not particularly limited, as long as it does not cause chemical changes in the battery and has conductivity. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder may include component that assists bonding between the active material and the conductive material and bonding with respect to the collector, and may be generally added in an amount of about 1 wt % to 30 wt % based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc. The filler may be a component optionally used to inhibit expansion of the positive electrode. The filler is not particularly limited, as long as it does not cause chemical changes in the battery and is a fibrous material. Examples thereof may include olefinic polymers such as polyethylene, polypropylene, etc.; and fibrous materials such as glass fibers, carbon fibers, etc.

The negative electrode may be fabricated by applying a negative electrode active material onto a negative electrode collector and drying the collector. When necessary, the above-described components may be further included, optionally. For example, the negative electrode active material may include, carbon such as non-graphitized carbon, a graphitized carbon, etc.; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, II or III elements of the periodic table, halogen; $0<x\leq1$; $1\leq y\leq 3$; $1\leq z\leq 8$), etc.; lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, etc.; conductive polymers such as polyacetylene, etc.; Li—Co—Ni-based materials.

The separator and the separation film may be interposed between the positive electrode and the negative electrode. An insulating thin film having high ion permeability and mechanical strength may be used. The separator may have a pore diameter of about 0.01 μm to 10 μm and a thickness of about 5 μm to 300 μm. For example, the separator, may include a sheet or non-woven fabric made of an olefinic polymer, such as polypropylene having chemical resistance and hydrophobicity, etc.; or a glass fiber or polyethylene. When a solid electrolyte such as a polymer is employed as the electrolyte, the solid electrolyte may also serve as both the separator and the electrolyte.

Further, in an exemplary embodiment, to improve safety of the battery of high energy density, the separator and/or separation film may be an organic/inorganic composite porous SRS (Safety-Reinforcing Separators). The SRS separator may be manufactured by applying an active layer, including inorganic particles and a binder polymer, onto a polyolefin-based separator substrate. In other words, the SRS separator may have a pore structure included in the separator substrate and a uniform pore structure formed by the interstitial volume among inorganic particles as active layer ingredients.

Compared to use of a common separator, use of the organic/inorganic composite porous separator may to increase of the battery thickness and may inhibit swelling during a formation process. When a gellable polymer is used as a binder polymer component and a liquid electrolyte is impregnated, the organic/inorganic composite porous separator may also serve as an electrolyte. Further, since the organic or inorganic composite porous separator may exhibit excellent adhesion property by controlling the contents of inorganic particles and binder polymer which are active layer components present in the separator, a battery assembly process may be more easily performed.

The inorganic particles are not particularly limited, as long as they are electrochemically stable. In other words, the inorganic particles that may be used in the present disclosure are not particularly limited, as long as the inorganic particles are not oxidized and/or reduced within an operating voltage range (e.g. 0 to 5 V based on $Li/Li^+$) of a battery to which inorganic particles are applied. In particular, when inorganic particles having ion transfer ability are used, it is possible to improve ion conductivity in an electrochemical element, thereby improving the performance of the battery. Consequently, it is preferable that ion conductivity of the inorganic particles is as high as possible. In addition, when the inorganic particles have high density, it may be difficult to disperse the inorganic particles at the time of coating, and the weight of the battery may increase. For these reasons, it is preferable that density of the inorganic particles is as low as possible. Additionally, when the inorganic particles have high permittivity, a degree of dissociation of electrolyte salts, such as lithium salts, in a liquid electrolyte may increase, thereby improving ion conductivity of the electrolyte.

The non-aqueous electrolyte containing lithium salts may be composed of an organic electrolyte and lithium salt. A non-aqueous liquid electrolyte, an organic solid electrolyte, or an inorganic solid electrolyte may be used as the organic electrolyte. The non-aqueous liquid electrolyte may be a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc. The organic solid electrolyte may include polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc. The lithium salts are readily dissolved in the non-aqueous electrolyte, and may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

Further, the lithium salt-containing non-aqueous electrolyte may include electrolyte additives, and the electrolyte additives may include at least one of ethylene carbonate, vinyl acetate, vinyl ethylene carbonate, thiophene, 1,3-propane sultone, succinic anhydride, and dinitrile additive. The dinitrile additive may be at least one of malononitrile, succinonitrile, glutaronitrile, adiponitrile, and phthalonitrile. In order to improve charge/discharge characteristics and flame retardancy, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added. Optionally, halogen-containing solvents such as carbon tetrachloride or ethylene trifluoride may be further added in order to provide flame resistance, or carbon dioxide gas may be further added in order to enhance high-temperature retention properties. Further, the exemplary embodiments of the present disclosure provide a battery pack that may include the secondary battery and a device that may include the battery pack.

As described above, since a positive electrode active material particle according to exemplary embodiment may include a core that contains lithium cobalt oxide and a shell that is coated on the surface of the core and contains composite metal oxide of a metal with an oxidation number of +2 and a metal with an oxidation number of +3, reactivity with an electrolyte may be reduced due to the surface protecting effect of lithium cobalt oxide, compared to the known positive electrode active material particle including lithium cobalt oxide. Accordingly, a safety reduction concerns (e.g., a swelling phenomenon caused by gas generation) may be prevented, and surface structural changes at high voltages may be inhibited to improve structural stability of the positive electrode active material particle. Consequently, the lifespan property of the secondary battery may be improved. In addition, the shell has a layered structure to allow relatively easy movement of lithium ions in the shell, thereby effectively preventing deterioration of a rate property of the secondary battery.

EXAMPLES

Example 1

In particular, in an experimental example 100 g of $LiCoO_2$ of a particle state, of which particle size was distributed in the range of 10 to 20 micrometer, was dispersed in 100 ml of water. A solution, which was prepared by mixing $CoCl_2$ and $Al_2(SO_4)_3$ in water at a molar ratio of Co:Al=1:2, was added thereto, such that (Co+Al) was 5000 ppm with respect to $LiCoO_2$. This mixture was mixed, together with zirconia balls, using a ball mill. The mixture (pH=10) was filtered and dried at 130° C., followed by sintering at 1000° C. for 5 hours under atmospheric environment. Consequently, an active material of a core-shell structure having a shell thickness of 10 nm was prepared. An SEM image of the prepared active material is shown in FIG. 1. As shown in FIG. 1, $CoAl_2O_4$ of a layered structure was structurally identical to a layered structure of $LiCoO_2$ that was formed on the surface, and adhered onto the surface.

Example 2

Figure 2:
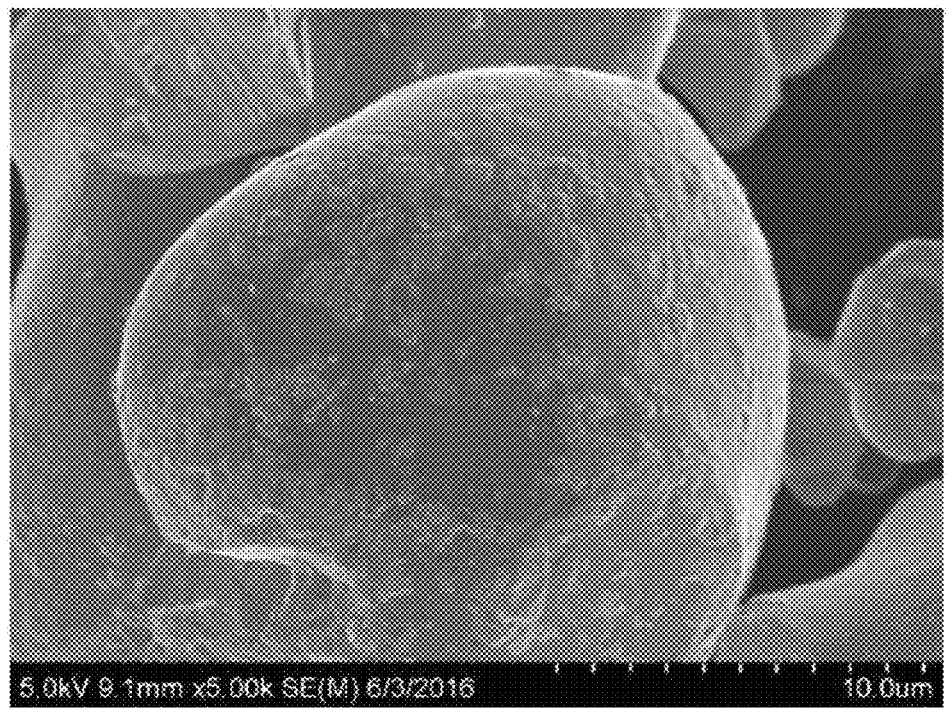
FIG. 2 is an exemplary SEM image of a positive electrode active material particle according to an exemplary embodiment of the present disclosure.

Additionally, in an experimental example, sodium hydroxide was mixed with a solution which was prepared by mixing $CoCl_2$ and $Al_2(SO_4)_3$ in 500 ml of water at a molar ratio of Co:Al=1:2, and this mixture was allowed to co-precipitate, thereby preparing Co—Al-based hydroxide ($CoAl_2(OH)_8$). Further, 100 parts by weight of $LiCoO_2$ of a particle state, of which particle size was distributed in the range of 10 to 20 micrometer, and 1 part by weight of $CoAl_2(OH)_8$ were dry-mixed. Then, sintering was performed at 1000° C. for 5 hours to prepare a $CoAl_2O_4$-containing active material of a core-shell structure having a shell thickness of 10 nm. An SEM image of the prepared active material is shown in FIG. 2. As shown in FIG. 2, the $CoAl_2O_4$ coating was evenly distributed throughout the surface of $LiCoO_2$ and exists as a coating layer of a continuous layered structure with respect to $LiCoO_2$ core, unlike Example 1.

Comparative Example 1

In an exemplary comparative example, $LiCoO_2$ of a particle state, of which particle size was distributed in the range of 10 to 20 micrometer, was used as a positive electrode active material particle.

Experimental Example 1

In particular, each of the positive electrode active material particles prepared in Examples 1 to 2 and Comparative Example 1, a PVdF binder, and a natural graphite conductive material were mixed well at a weight ratio of 95:2.5:2.5 (e.g., positive electrode active material:binder:conductive material) in NMP, and then applied to an AL foil having a thickness of 20 µm, and dried at 130° C. to manufacture each positive electrode. As a negative electrode, a lithium foil was used, an electrolyte containing 1M $LiPF_6$ in a solvent of EC DMC:DEC=1:2:1 was used to manufacture a plurality of coin-type half cells.

Figure 3:
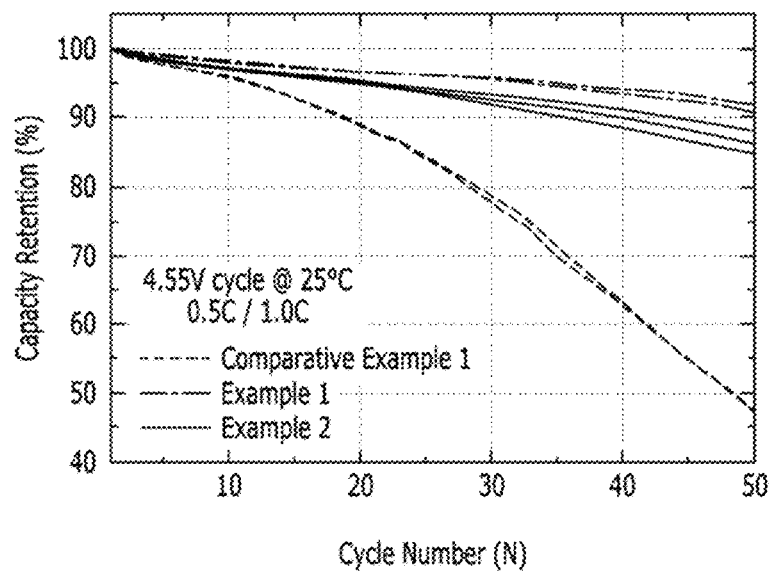
FIG. 3 is an exemplary graph comparing lifespan properties at 25° C. according to an exemplary embodiment of the present disclosure.
Figure 4:
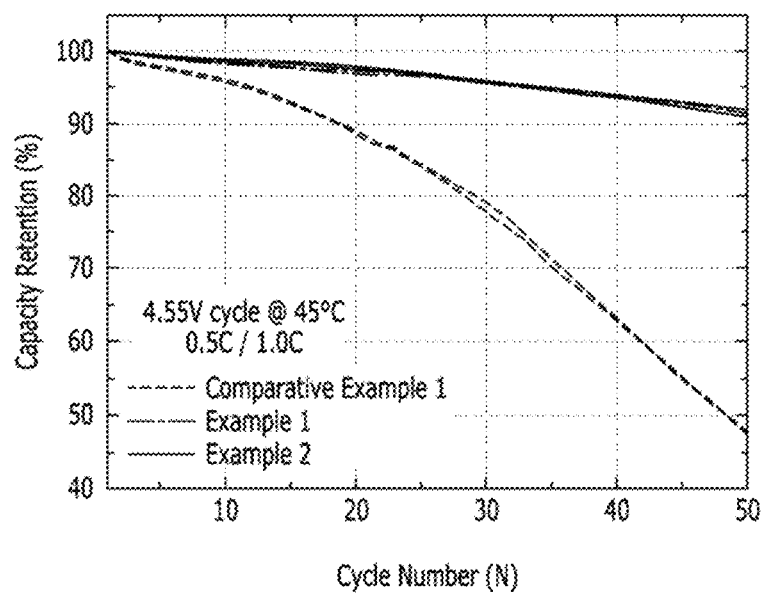
FIG. 4 is an exemplary graph comparing lifespan properties at 45° C. according to an exemplary embodiment of the present disclosure.

A plurality of coin-type half cells thus manufactured were charged and discharged at 0.1 C in CC/CV charging mode of an upper voltage limit of 4.55 V and in CC discharging mode of a lower voltage limit of 2.5 V at 25° C. and 45° C., respectively and charge/discharge lifespan characteristics at 0.5 C/1 C were evaluated. The results are shown in the following FIGS. 3 and 4. Referring to FIGS. 3 and 4, the cells of Examples showed capacity retention rates of 80% or more even after 50 cycles, because surface stability was improved even at high voltages of 4.55 V or higher. In contrast, the cell of Comparative Example 1 showed that its lifespan characteristic was rapidly reduced to 70% or less before 40 cycles, indicating complete reduction of structural stability.

Although the present disclosure has been described in connection with the exemplary embodiments of the present disclosure, it will be apparent to those skilled in the art that various modifications and changes may be made thereto from the foregoing description without departing from the scope of the present disclosure.

The invention claimed is:

1. A positive electrode active material particle, comprising:
   a core, wherein the core is $LiCoO_2$; and
   a shell that is coated on a surface of the core, wherein the shell is $CoAl_2O_4$ having a layered crystal structure, wherein a thickness of the shell is about 5 nanometer to about 100 nanometer.

2. The positive electrode active material particle of claim 1, wherein the shell is formed on the area of about 50% to about 100% of the surface area of the core.

3. The positive electrode active material particle of claim 1, wherein the positive electrode active material particle further includes an outermost surface layer that is coated on the shell and includes a composite metal oxide of a metal with an oxidation number of +2 and a metal with an oxidation number of +3.

4. The positive electrode active material particle of claim 3, wherein at least one of metals that forms the outermost surface layer is a metal not included in the shell.

5. A secondary battery comprising a positive electrode including the positive electrode active material particle of claim 1, a negative electrode, and an electrolyte.

6. The secondary battery of claim 5, wherein the electrolyte includes electrolyte additives and dinitrile additive,
   wherein the electrolyte additives include at least one of ethylene carbonate, vinyl acetate, vinyl ethylene carbonate, thiophene, 1,3-propane sultone, succinic anhydride, and wherein the dinitrile additive is at least one of malononitrile, succinonitrile, glutaronitrile, adiponitrile, and phthalonitrile.

7. A battery pack comprising the secondary battery of claim 5.

8. A device comprising the battery pack of claim 7.

* * * * *